United States Patent
McDysan et al.

(10) Patent No.: US 9,386,147 B2
(45) Date of Patent: Jul. 5, 2016

(54) MUTING AND UN-MUTING USER DEVICES

(75) Inventors: David E. McDysan, Great Falls, VA (US); Stevan H. Leiden, Norwood, MA (US); Daniel J. O'Callaghan, Fairfax Station, VA (US); Douglas M. Pasko, Bridgewater, NJ (US); John Edward Rathke, Southborough, MA (US); Naseem A. Khan, Oak Hill, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 251 days.

(21) Appl. No.: 13/217,765

(22) Filed: Aug. 25, 2011

(65) Prior Publication Data

US 2013/0051543 A1 Feb. 28, 2013

(51) Int. Cl.
*H04M 3/42* (2006.01)
*H04M 3/428* (2006.01)
*H04M 3/56* (2006.01)

(52) U.S. Cl.
CPC ............ *H04M 3/4286* (2013.01); *H04M 3/568* (2013.01); *H04M 3/569* (2013.01); *H04M 2203/255* (2013.01); *H04M 2203/258* (2013.01)

(58) Field of Classification Search
CPC ... H04M 3/56; H04M 3/568; H04M 2250/62; H04M 3/567; H04M 2203/5063; H04M 2203/5009; H04M 2201/40; H04M 2203/5027; H04M 2203/5054; H04M 3/42059; H04M 3/566; G06F 3/165; G10L 15/265; G10L 15/22; G10L 15/07; G10L 15/32
USPC .............. 379/88.02, 202.01, 203.01–206.01; 704/235, 246; 455/416; 370/260–269
See application file for complete search history.

(56) References Cited

U.S. PATENT DOCUMENTS

| | | | |
|---|---|---|---|
| 7,099,825 B1 * | 8/2006 | Cook ............................. | 704/251 |
| 8,060,366 B1 * | 11/2011 | Maganti et al. ............... | 704/246 |
| 8,311,196 B2 * | 11/2012 | Hanson et al. ............ | 379/201.01 |
| 2004/0006477 A1 * | 1/2004 | Craner ........................ | 704/275 |
| 2008/0165937 A1 * | 7/2008 | Moore ....................... | 379/88.04 |
| 2009/0220064 A1 * | 9/2009 | Gorti et al. ............... | 379/202.01 |
| 2010/0080382 A1 * | 4/2010 | Dresher et al. .............. | 379/421 |
| 2012/0051533 A1 * | 3/2012 | Byrne et al. ............. | 379/204.01 |
| 2012/0166188 A1 * | 6/2012 | Chakra et al. ................ | 704/226 |
| 2012/0169465 A1 * | 7/2012 | Chang et al. ................. | 340/5.83 |
| 2012/0189140 A1 * | 7/2012 | Hughes ......................... | 381/123 |

* cited by examiner

*Primary Examiner* — Oleg Asanbayev

(57) ABSTRACT

A device is configured to determine that the user device is participating in a conference call with a plurality of other user devices; determine that the user device is muted during the conference call; receive a first sound from the user device while the user device is muted; recognize that the first sound matches a vocal pattern of a user associated with the user device; and un-mute the user device after recognizing that the first sound matches the vocal pattern.

18 Claims, 6 Drawing Sheets

MUTING AND UN-MUTING USER DEVICES

BACKGROUND

Users, of user devices, increasingly use conference calls to communicate with one another. To minimize undesired sounds (e.g., inappropriate and/or distracting sounds) from being communicated to other users during a conference call, a user can mute his/her telephone device when the user is not speaking to the other users during the conference call. The user often forgets to un-mute the telephone device when he/she begins speaking, to the other users via the conference call, after previously muting the telephone device. As a result, the other users cannot hear the user speaking and a silence can ensue, during the conference call, if the other users are waiting for the user to speak. At the same time, a user often forgets to mute his/her telephone device when he/she is not speaking during a conference call with other users. Consequently, the other users can hear inappropriate and/or distracting sounds, which are in the background of the user and are being transmitted via the un-muted telephone device of the user. These sounds are often distracting to the other users and can reduce the productivity of the conference call.

DETAILED DESCRIPTION OF PREFERRED EMBODIMENTS

The following detailed description refers to the accompanying drawings. The same reference numbers in different drawings may identify the same or similar elements.

Herein, a conference call may refer to a telephone conference call and/or a video conference call. A user device may refer to any communication device that is used by a user to communicate during a conference call, including, for example, a landline telephone, a mobile telephone, video conferencing equipment, a personal computer, etc. The user device may execute an application to prompt muting and/or un-muting of the user device and/or a different device.

Muting a user device may include ending transmission of sounds received via a microphone of the user device, transmitting instructions to the user device to stop receiving sounds via the microphone of the user device, and/or cancelling and/or suppressing one or more particular sounds received from the user device. Canceling and/or suppressing particular sounds may include eliminating all sounds except a sound of a voice of a user associated with the user device.

Prompting muting and/or un-muting of a user device may include and refer to muting and/or un-muting the user device, automatically muting or un-muting the user device, starting a process to automatically mute and/or un-mute the user device, and/or starting a process to prompt a user to manually mute and/or un-mute the user device. The process may include indicating to a user of the user device that the user device may need to be muted and/or un-muted; receiving a command from the user, in response to the indication; and/or muting and/or un-muting the user device in response to the command. A user of the user device may select an automatic mode to automatically mute or un-mute the user device and/or an indicator mode for the user to receive an indicator before the user manually performs muting and/or un-muting of the user device.

An implementation, described herein, may prompt a process to automatically mute or un-mute a user device, when appropriate, during a conference call. For example, a user of a user device may mute the user device during a conference call. Thereafter, the user device or a remote server may determine that the user is speaking. In response, the user device or the remote server may automatically, without intervention of the user, un-mute the user device or indicate to the user that the user device is muted. When the user device is un-muted, the user device or the remote server may determine that an inappropriate sound (e.g., predefined, selected/specified by the user, etc.) is being transmitted via the user device. In response, the user device or the remote server may automatically mute the user device or indicate to the user that the user device is un-muted.

Figure 1:
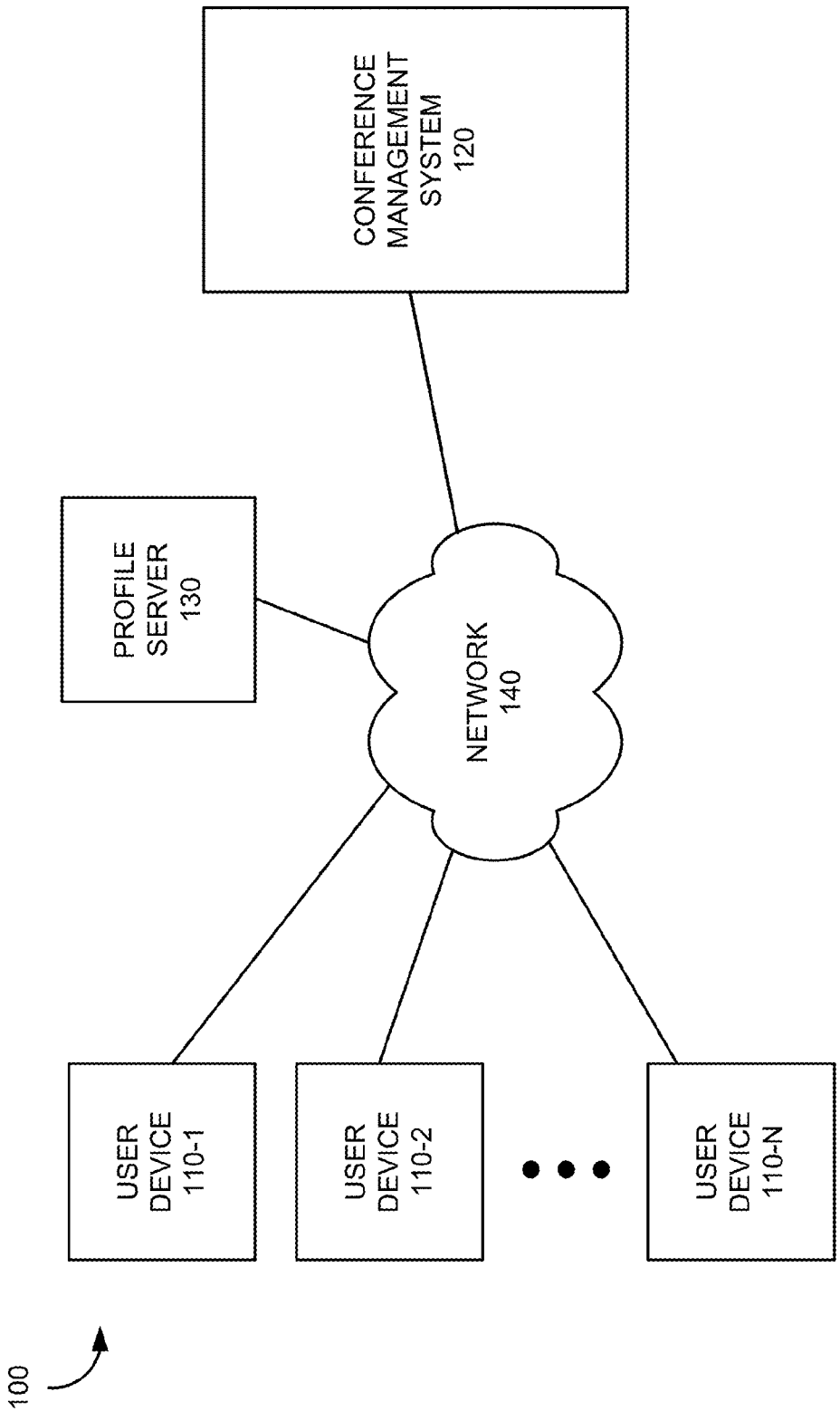
FIG. 1 is a diagram of an example environment in which systems and/or methods described herein may be implemented.

FIG. 1 is a diagram of an example environment 100 in which a system and/or method described herein may be implemented. As shown in FIG. 1, environment 100 may include one or more of the following components: user devices 110-1, 110-2, . . . , 110-N (where N≥1) (collectively referred to as "user devices 110" and individually as "user device 110"); a conference management system 120; a profile server 130; and a network 140. In practice, environment 100 may include additional components, fewer components, different components, or differently arranged components than are shown in FIG. 1.

In some implementations, one or more of the components of environment 100 may perform one or more functions described as being performed by another one or more of the components of environment 100. For example, user device 110 and conference management system 120 could be integrated into a single device that performs all or some of the functions described below as being performed by an individual one of these devices. In another example, conference management system 120 and profile server 130 could be integrated into a single device that performs all or some of the functions described below as being performed by an individual one of these devices. In yet another example, user device 110, conference management system 120, and profile server 130 could be integrated into a single device that performs all or some of the functions described below as being performed by an individual one of these devices.

Furthermore, two or more of the components, of FIG. 1, may be implemented within a single device, or a single device may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

User device 110 may include any communication device, such as a communication device that is capable of communicating with other user devices 100 and/or conference management system 120 via network 140. User device 110 may include or be connected to a microphone. In one implementation, user device 110 may take the form of a landline telephone device, a cordless telephone device, a mobile telephone device, a smart phone, a personal digital assistant (PDA), a personal media player, and/or any other device used to participate in a conference call. In another implementation, user device 110 may take the form of a web service terminal, a personal computer, a laptop, a handheld computer, and/or any other computer that allows a user to participate in a conference call. In yet another implementation, user device 110 may take the form of a videoconferencing system and/or any other dedicated conferencing equipment (e.g., a specialized telephone for telephone conference calls).

A user, of user device 110, may manually mute and/or un-mute user device 110 by using user device 110. The user may use user device 110 to register user device 110 to prompt muting and/or un-muting of user device 110 when particular conditions are met. The user may set the particular conditions while registering user device 110. The user may also set whether the muting and/or the un-muting is automatic or requires the intervention of the user when one of the particular conditions is met. User device 110 and/or a remote server (e.g., profile server 130) may store information about the particular conditions and consequences (e.g., automatic muting) when the particular conditions are met. In one implementation, user device 110 may determine that a particular condition is met (e.g., recognize a vocal pattern of the user) and prompt the muting and/or the un-muting of user device 110. In another implementation, a remote server (e.g., conference management system 120) may determine that a particular condition is met and prompt the muting and/or the un-muting of user device 110.

Conference management system 120 may include any computation or communication device, such as a communication device that is capable of communicating with user device 110 and/or profile server 130. Conference management system 120 may include a single server device or a collection of multiple server devices and/or computer systems. Conference management system 120 may handle a registration to prompt muting and/or un-muting of user device 110. Conference management system 120 may further prompt muting and/or un-muting of user device 110 when particular conditions are met. Conference management system 120 may also manage (e.g., handle bridging for) a conference call between users of multiple user devices 110.

Profile server 130 may include any computation or communication device, such as a communication device that is capable of communicating with conference management system 120. Profile server 130 may include a single server device or a collection of multiple server devices and/or computer systems. Profile server 130 may store profiles associated with user devices 110, which are created when user devices 110 are registered for conference management system 120 to prompt muting and/or un-muting of user devices 110. Profile server 130 may receive profiles and/or updates to the profiles from conference management system 120. Profile server 130 may retrieve profiles in response to requests from conference management system 120. Profile server 130 may transmit the retrieved profiles and/or information in the retrieved profiles to conference management system 120.

Network 140 may include one or more wired and/or wireless networks. For example, network 140 may include a cellular network, a public land mobile network (PLMN), a second generation (2G) network, a third generation (3G) network, a fourth generation (4G) network, a fifth generation (5G) network, and/or another network. Additionally, or alternatively, network 140 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
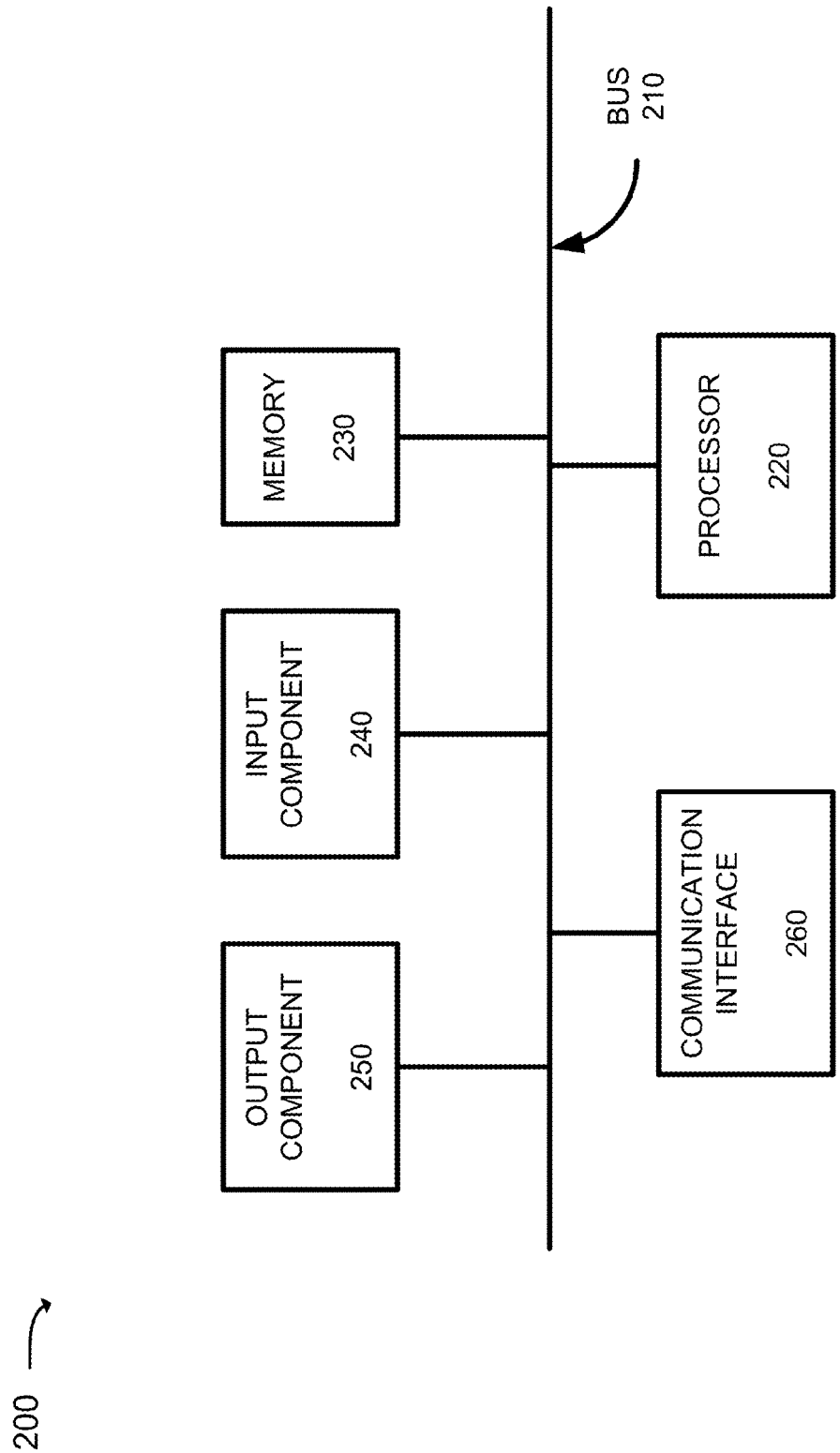
FIG. 2 is a diagram of example components of one or more of the devices of FIG. 1.

FIG. 2 is a diagram of example components of device 200 that may correspond to user device 110, conference management system 120, and/or profile server 130. Each one of user device 110, conference management system 120, and/or profile server 130 may include one or more devices 200 and/or one or more of each of the components of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path, or a collection of paths, that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include one or more input mechanisms that permit a user to input information to device 200. Output component 250 may include one or more output mechanisms that output information to the user. Examples of input and output mechanisms may include buttons, a touch screen interface to permit data and control commands to be input into device 200, a speaker to receive electrical signals and output audio signals, a microphone to receive audio signals and output electrical signals, a display to output visual information (e.g., video conference display, mute/unmute status, web pages, product information, etc.), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
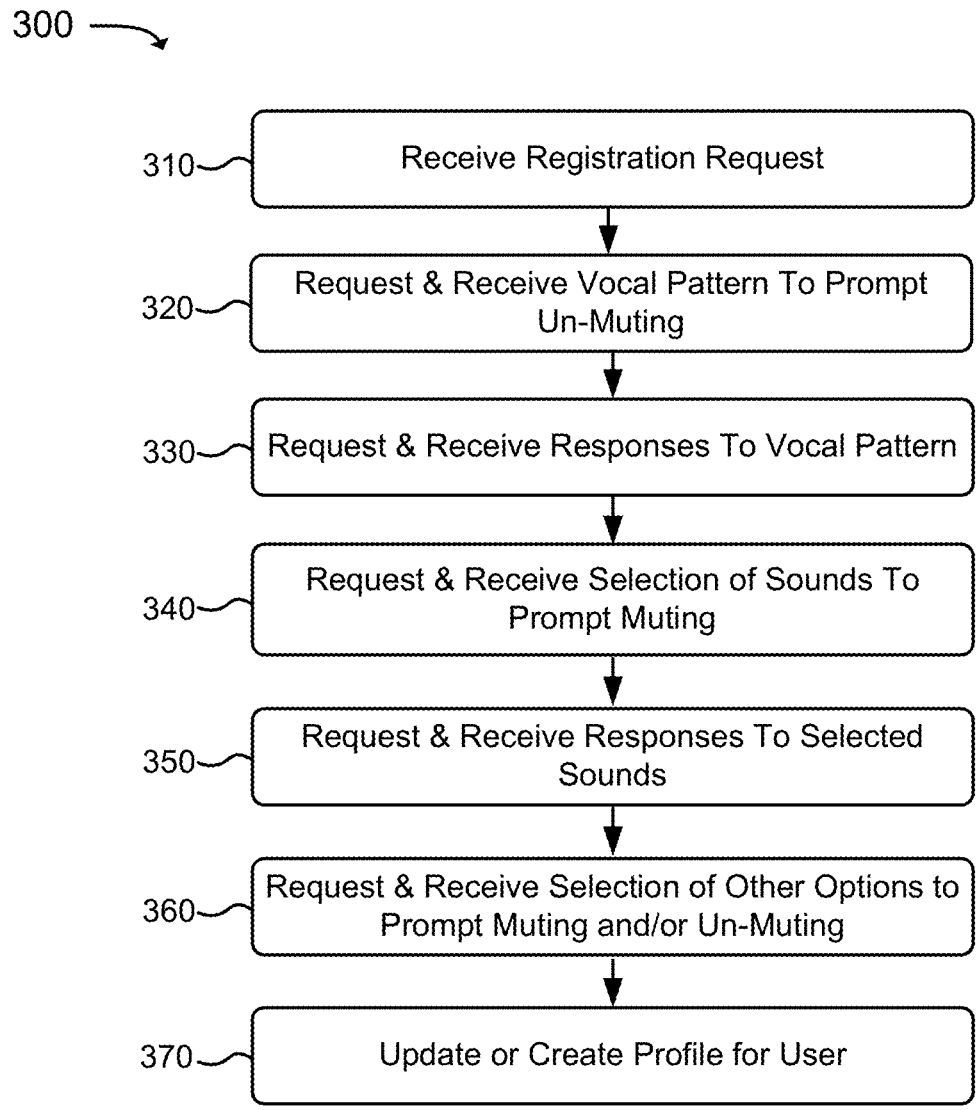
FIG. 3 is a flow chart of an example process for registering to prompt muting and un-muting of a user device.

FIG. 3 is a flow chart of an example process 300 for registering to prompt muting and un-muting of user device 110. In one implementation, conference management system 120 may perform process 300. In another implementation, a device or collection of devices separate from, or in combination with, conference management system 120 may perform some or all of process 300. For example, user device 110 may perform one or more of the operations described as being performed by conference management system 120.

As shown in FIG. 3, process 300 may include receiving a registration request (block 310). In one implementation, a user may decide to register to prompt muting and un-muting of user device 110. To register, the user may use user device 110 and/or another computing device (not shown in FIG. 1) to access a registration interface (e.g., a webpage, a selection page on a smart phone, etc.) provided by conference management system 120. Thereafter, in one implementation, the registration interface may prompt the user to enter user information (e.g., a username, a password, telephone numbers associated one or more user devices 110 of the user, etc.). Conference management system 120 may receive the entered user information as part of a registration request.

Process 300 may further include requesting and receiving a vocal pattern to prompt un-muting (block 320). For example, conference management system 120 may request that the user provide a vocal pattern of his/her voice and/or vocal patterns of other voices, of other people, that shall prompt un-muting of user device 110. In one implementation, the user may provide the vocal pattern by speaking into a microphone of user device 110 and/or of the other computing device being used by the user to register. In another implementation, the user may provide the vocal pattern via a recording of the user speaking and/or of the other voices. User device 110 and/or the other computing device may transmit the vocal pattern to conference management system 120. Conference management system 120 may receive the vocal pattern from user device 110 and/or the other computing device.

Process 300 may further include requesting and receiving responses to the vocal pattern (block 330). For example, conference management system 120 may request that the user provide instructions for how to respond to a recognition of the vocal pattern when the user is using user device 110 to participate in a conference call and user device 110 is muted. In one example, conference management system 120 may allow the user to select an automatic un-mute mode or an indicator to un-mute mode, as described further below. The user may select different modes for different circumstances (e.g., a time of the conference call, identities of other participants of the conference call, a location of user device 110 during the conference call (e.g., in an office of the user or a residence of the user), etc.). Conference management system 120 may receive the instructions regarding how to respond to the recognition of the vocal pattern (e.g., selection of the automatic un-mute mode or the indicator to un-mute mode for each one of the different circumstances) from user device 110 and/or the other computing device.

In other implementations, for each selection of the indicator to un-mute mode, the user may select a type of an indicator (e.g., a display notification (e.g., "Do you want to un-mute?") on a display associated with user device 110, an audio notification/signal (e.g., a tone, a recorded message (e.g., "Unmute now?"), etc.) via a speaker of user device 110, a visual notification/signal (e.g., a blinking light on user device 110), a physical signal (e.g., a vibration of user device 110), etc.) to be used to notify the user that user device 110 may need to be un-muted due to the recognition of the vocal pattern. The user may further select methods for responding to an indicator in order to un-mute user device 110. The methods may include, for example, pressing a button of user device 110, a voice command, a facial expression, a hand gesture, and/or any other method that allows the user to un-mute user device 110 in response to the indicator that user device 110 may need to be un-muted. The facial expression may include, for example, a particular movement of lips, tongue, and/or other parts of the face. The hand gesture, may include, for example, waving a hand, pointing a particular finger in a particular direction, and/or any other movement of the hand and or one or more parts of the hand. User device 110 may recognize the facial expression or the hand gesture based on an input of a video camera of/connected to user device 110.

Process 300 may also include requesting and receiving selection of sounds to prompt muting (block 340). For example, conference management system 120 may request that the user select one or more sounds that shall prompt muting of user device 110. In one implementation, conference management system 120 may transmit a list of generic sounds that the user may select to prompt muting. The generic sounds may include, for example, sounds of a baby crying, a dog barking, snoring, typing, a child speaking, yelling, a public announcement (e.g., at an airport, train, or bus station) and/or any other sounds that user device 110 and/or conference management system 120 can recognize. The user may enlist user device 110 and/or the other computing device to select one or more of the generic sounds. In another implementation, the user may select non-generic sounds by providing samples (e.g., recordings) of voices of other people (e.g., a voice sample of a spouse of the user) and/or of other sounds (e.g., a recording of the user's dog barking, a recording of the user snoring, etc.). Conference management system 120 may receive the generic sounds and the non-generic sounds, selected by the user, from user device 110 and/or the other computing device.

Process 300 may also include requesting and receiving responses to selected sounds (block 350). For example, conference management system 120 may request that the user provide instructions for how to respond to a recognition of each one of the selected sounds when the user is using user device 110 to participate in a conference call and user device 110 is un-muted. In one example, conference management system 120 may allow the user to select an automatic mute mode or an indicator to mute mode. The user may select different modes for different circumstances (e.g., a time of the conference call, identities of other participants of the conference call, a location of user device 110 during the conference call (e.g., in an office of the user or a residence of the user), etc.). Conference management system 120 may receive the instructions regarding how to respond to the recognition of each one of the selected sounds (e.g., selections of the automatic mute mode or the indicator to mute mode for each one of the different circumstances) from user device 110 and/or the other computing device.

In other implementations, for each selection of the indicator to mute mode, the user may select a type of indicator (e.g., a display notification that states "Do you want to mute?") that notifies the user that user device 110 may need to be muted due to the recognition of one of the selected sounds. The user may further select methods for responding to an indicator in order to mute user device 110. The methods may include, for example, pressing a button of user device 110, a voice command, a facial expression, a hand gesture, and/or any other method that allows the user to mute user device 110 in response to the indicator that user device 110 may need to be muted.

Process 300 may also include requesting and receiving selection of other options to prompt muting and/or un-muting of user device 110 (block 360). For example, conference management system 120 may provide options to prompt muting and/or un-muting of user device 110 when particular conditions are met. Conference management system 120 may provide a list of the options based on capabilities of user device 110 (e.g., whether user device 110 includes or is connected to a video camera). The user may use user device 110 and/or the other computing device to select one or more of the options. Conference management system 120 may receive selection of one or more of the options, from user device 110 and/or the other computing device. As described above with regard to blocks 330 and 350, the user may also provide responses (e.g., select a particular mode) for one or more of the selected options.

In one example, the options may include prompting muting of user device 110 when the vocal pattern of the user and/or any other sound is not recognized for a particular period of time after a point in time when the vocal pattern was last recognized. In another example, the options may include muting and/or un-muting the device based on facial recognition. For example, the options may include prompting the muting of user device 110 when lips of the user are not moving for a first period of time and prompting the un-muting of user device 110 when the lips of the user are moving for a second period of time. In yet another example, the options may include muting and/or un-muting the device based on hand gestures. For example, the options may include prompting the muting of user device 110 based on a first hand gesture (e.g., a wave with a right hand) and prompting the un-muting of user device 110 based on a second hand gesture (e.g., a wave with the right hand or a wave with the left hand).

Process 300 may include updating or creating a profile for the user (block 370). For example, profile server 130 may store profiles of different users. If profile server 130 does not store a profile for the user of user device 110, conference management system 120 may create the profile (e.g., a default profile that includes commonly used settings) or transmit information for the profile to profile server 130. If profile server 130 already stores the profile for the user of user device 110, conference management system 120 may update the profile based on new information provided by the user and/or collected about the user and/or about user device 110. The profile may include the user information associated with the user, information about user device 110 (e.g., a telephone number, an Internet Protocol (IP) address, a device identifier, etc.), information received from the user regarding preferences for prompting muting and/or un-muting user device 110 (described above with reference to blocks 320-360 of FIG. 3), and/or any other relevant information. Conference management server 120 may retrieve the profile from profile server 130 when the user participates in a conference call and/or when user device 110 is used for the conference call. The user may use user device 110 to request (e.g., via conference management server) and review information (e.g., the selections) included in the profile of the user. The user may further use user device 110 to modify the profile, as described above with reference to process 300.

Figure 4:
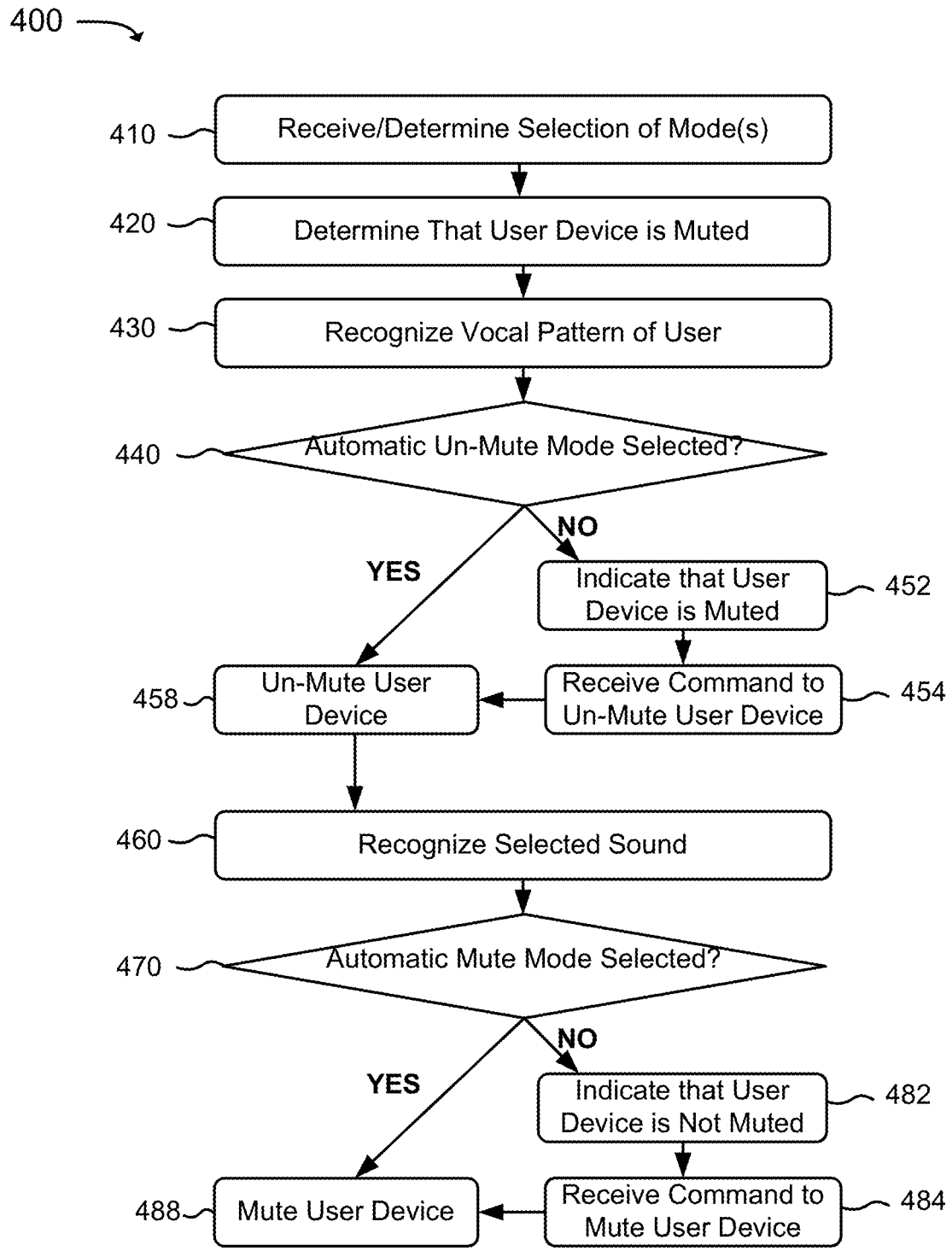
FIG. 4 is a flow chart of an example process for prompting muting and/or un-muting of a user device.

FIG. 4 is a flow chart of an example process 400 for prompting muting and un-muting of user device 110. In one implementation, conference management system 120 may perform process 400. In another implementation, a device or collection of devices separate from, or in combination with, conference management system 120 may perform some or all of process 400. For example, user device 110 may perform one or more of the operations described as being performed by conference management system 120. Furthermore, one or more of the process blocks depicted in FIG. 4 may be performed concurrently and independently of one or more other process blocks.

As shown in FIG. 4, process 400 may include receiving and/or determining selection of one or more modes (block 410). For example, a user may use user device 110 to participate in a conference call with other participants. In one implementation, as discussed above in reference to FIG. 3, the user may select modes for prompting muting and/or un-muting of user device during a registration process before the conference call. When conference management system 120 determines that the user and/or user device 110 is participating in the conference call, conference management system 120 may retrieve, from profile server 130, a profile associated with the user and/or user device 110. Conference management system 120 may determine modes to apply during the conference call for user device 110. The profile may indicate that the user selected an automatic un-mute mode or an indicator un-mute mode and an automatic mute mode or an indicator mute mode.

In another implementation, after the user uses user device 110 to initiate participation in the conference call (e.g., by dialing a bridge number associated with the conference call), conference management system 120 may request for the user of user device 110 to select the automatic un-mute mode or the indicator un-mute mode and the automatic mute mode or the indicator mute mode. The user may use user device 110 to select the modes. Conference management system 120 may receive the selection of the modes, for user device 110, during the conference call. In yet another implementation, the user of user device 110 may switch between the automatic un-mute mode and the indicator un-mute mode and/or between the automatic mute mode and the indicator mute mode during the conference call. Conference management system 120 may receive selections of the modes, when the user switches between modes, during the conference call.

Process 400 may further include determining that a user device is muted (block 420). For example, after the conference call begins, the user of user device 110 may press a button of user device 110 to mute user device 110. User device 110 may transmit an indicator to conference management system 120 that user device 110 is muted. Conference management system 120 may determine that user device 120 is muted based on the indicator. Conference management system 120 may also, or alternatively, determine that user device 110 is muted without input from the user, as discussed further below.

Process 400 may also include recognizing a vocal pattern of a user (block 430) and determining whether an automatic un-mute mode is selected (block 440). For example, after determining that user device 110 is muted, the user may begin speaking into a microphone of user device 110. In one implementation, user device 110 may transmit the sound (waves) of the user speaking (e.g., in the form of electrical signals) to conference management system 120. Conference management system 120 may receive the sound and recognize that the received sound matches a vocal pattern (e.g., a registered vocal pattern) of the user. In another implementation, user device 110 may recognize that the sound matches the vocal pattern of the user. User device 110 may notify conference management system 120 that the user is speaking (e.g., that the vocal pattern of the user is recognized via the microphone of user device 110). Thereafter, conference management system 120 may determine whether the automatic un-mute mode or the indicator un-mute mode is selected for user device 110.

If the automatic un-mute mode is not selected (block 440—NO), process 400 may include indicating that the user device is muted (block 452) and receiving a command to un-mute the user device (block 454). For example, conference management system 120 may determine that the automatic un-mute mode is not selected when the user profile associated with the user does not indicate that the automatic un-mute mode has been selected. When the automatic un-mute mode is not selected, conference management system 120 may determine that the indicator un-mute mode is selected. After determining that the indicator un-mute mode is selected, conference management system 120 may determine an indicator associated with the indicator un-mute mode (e.g., the indicator selected by the user for the mode). Conference management system 120 may transmit a message to user device 110 for user device 110 to provide the indicator (e.g., display a message, make an announcement, blink a light, play a tone, etc.) to the user of user device 110. Based on the indicator, while the user is speaking, the user may determine that user device 110 is muted. In response to the indicator, the user may provide a command (e.g., by pressing a button, making a hand gesture, etc.) to un-mute user device 110. User device 110 may transmit the command to conference management system 120. Conference management system 120 may receive the command.

If the automatic un-mute mode is selected (block 440—YES) or after receiving the command to un-mute the user device (block 454), process 400 may include un-muting the user device (block 458). For example, after conference management system 120 determines that the automatic un-mute mode is selected or after receiving the command to un-mute user device 110, conference management system 120 may automatically transmit instructions to user device 110 to un-mute user device 110. User device 110 may un-mute user device 110 in response to the instructions. In another implementation, user device 110 may immediately un-mute user device 110 after the user provides the command to un-mute user device 110 (e.g., without receiving the instruction from conference management system 120).

In another embodiment, conference management system 120 may notify the user of user device 110 that user device 110 is muted and automatically un-mute user device 110 after a particular amount of time (e.g., 1 second, 2 seconds, etc.). Conference management system 120 may notify the user by transmitting a message to user device 110 for user device 110 to provide the indicator (e.g., selected by the user) to the user of user device 110.

Process 400 may also include recognizing a selected sound (block 460) and determining whether an automatic mute mode is selected (block 470). For example, after user device 110 is un-muted, user device 110 may receive a background sound (e.g., snoring, barking, yelling, etc.) via the microphone of user device 110. In one implementation, user device 110 may transmit the background sound to conference management system 120. Conference management system 120 may receive the background sound and recognize that the background sound matches one of one or more sounds selected (e.g., by the user) to prompt the muting of user device 110. In another implementation, user device 110 may recognize that the background sound matches one of the selected sounds. User device 110 may notify conference management system 110 that one of the selected sounds is recognized (e.g., that the background sound is recognized via the microphone of user device 110). Thereafter, conference management system 120 may determine whether the automatic mute mode or the indicator mute mode is selected for user device 110 during the conference call. Herein, a user may not select a selected sound. Conference management system 120 may pre-load one or more undesirable sounds. Accordingly, herein, a selected sound may refer to one of the undesirable sounds.

If the automatic mute mode is not selected (block 470—NO), process 400 may include indicating that the user device is not muted (block 482) and receiving a command to mute the user device (block 484). For example, conference management system 120 may determine that the automatic mute mode is not selected when the user profile associated with the user does not indicate that the automatic mute mode has been selected. When the automatic mute mode is not selected, conference management system 120 may determine that the indicator mute mode is selected. After determining that the indicator mute mode is selected, conference management system 120 may determine an indicator associated with the indicator mute mode. Conference management system 120 may transmit a message to user device 110 for user device 110 to provide the indicator to the user of user device 110. Based on the indicator, while the background sound is received by the microphone of user device 110, the user of user device 110 may recognize that user device 110 is un-muted. In response to the indicator, the user may provide a command to mute user device 110. User device 110 may transmit the command to mute user device 110 to conference management system 120. Conference management system 120 may receive the command.

If the automatic mute mode is selected (block 470—YES) or after receiving the command to mute the user device (block 484), process 400 may include muting the user device (block 488). For example, after conference management system 120 determines that the automatic mute mode is selected or after receiving the command to mute user device 110, conference management system 120 may automatically transmit instructions to user device 110 to mute user device 110. User device 110 may mute user device 110 in response to the instructions. In another implementation, user device 110 may immediately mute user device 110 after the user provides the command to mute user device 110 (e.g., without receiving the instruction from conference management system 120).

Figure 5:
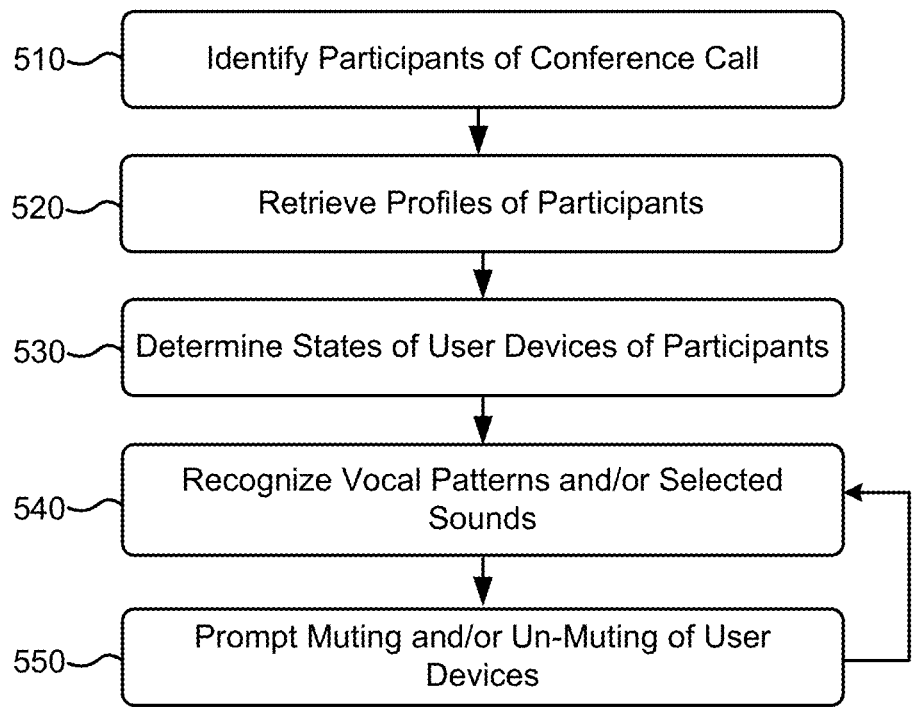
FIG. 5 is a flow chart of an example process for managing a conference call.

FIG. 5 is a flow chart of an example process 500 for managing a conference call. In one implementation, conference management system 120 may perform process 500. In another implementation, a device or collection of devices separate from, or in combination with, conference management system 120 may perform some or all of process 500.

As shown in FIG. 5, process 500 may include identifying participants of a conference call (block 510), retrieving profiles of the participants (block 520), and determining states of user devices of the participants (block 530). For example, two or more participants may participate in a conference call by using user devices 110 to dial one or more bridge numbers associated with the conference call. Conference management system 120 may identify the participants of the conference call based on unique identifiers (e.g., IP addresses, telephone numbers of user devices 110, user names, personal identification numbers, device identifiers, etc.) associated with user devices 110 or users of user devices 110. Conference management system 120 may retrieve, from profile server 130, the profiles for the participants based on the unique identifiers. Thereafter, conference management system 120 may determine states of user devices 110 of the participants. A state of user device 110 may indicate whether user device 110 is muted or not muted. Conference management system 120 may determine whether user device 110 is muted in a process similar to one described above with reference to block 420 of FIG. 4. For example, conference management system 120 may determine that a state of user device 110-1 is muted, a state of user device 110-2 is not muted, etc.

Process 500 may further include recognizing vocal patterns and/or selected sounds (block 540) and prompting muting and/or un-muting of user devices (block 550). For example, conference management system 120 may receive sounds that are transmitted via microphones of user devices 110 of the participants. Conference management system 120 may recognize vocal patterns and/or selected sounds that match the received sounds based on the profiles associated with the user devices. In response, conference management system 120 may determine to prompt muting and/or un-muting of one or more of user devices 110.

For example, conference management system 120 may receive a sound from user device 110-1. Conference management system 120 may determine to prompt un-muting of user device 110-1 when user device 110-1 is muted and the sound matches a user vocal pattern specified by the profile associated with user device 110-1. In another example, conference management system 120 may receive a sound from user device 110-2. Conference management system 120 may determine to prompt un-muting of user device 110-1 when user device 110-1 is un-muted and the sound matches a selected sound (e.g., dog barking) specified by the profile associated with user device 110-1.

In another implementation, conference management system 120 may access and/or generate a rank of the participants of the conference call. In one example, the participants may be ranked based on the bridge telephone numbers or participant codes which the participants used to dial-in to the conference call. One or more of the participants that used a moderator bridge telephone number may be ranked higher than other participants who used a participant bridge telephone number or code. In another example, the participants may be ranked based on information specified in the profiles or information associated with user devices 110 of the participants. Each profile may indicate a rank associated with a corresponding one of the participants. The rank may be based on a position/title of the participant (e.g., Executive, Junior Executive, Senior Engineer, Junior Engineer, Attorney, etc.). When conference management system 120 receives the sounds from particular user devices 110, conference management system 120 may determine that more than one of the participants, associated with the particular user devices 110, is speaking at one time. As a result, conference management system 120 may determine a conflict during the conference call. To resolve the conflict, conference management system 120 may identify which one of the particular user devices 110 is associated with a rank higher than all other ones of the particular user devices 110. Conference management system 120 may mute all of the other ones of the particular user devices 110 to allow only the participant associated with the identified user device 110 to be heard by all participants.

In yet another implementation, one of the participants (e.g., with the highest rank) may direct conference management system 120 to forcibly mute and/or un-mute user devices 110 of one or more of the participants of the conference call. Conference management system 120 may transmit notifications to user devices 110 that are forcibly muted and/or un-muted. In still yet another implementation, the participants may send alerts and/or messages to one another, via conference management system 120, during the conference call.

Figure 6:
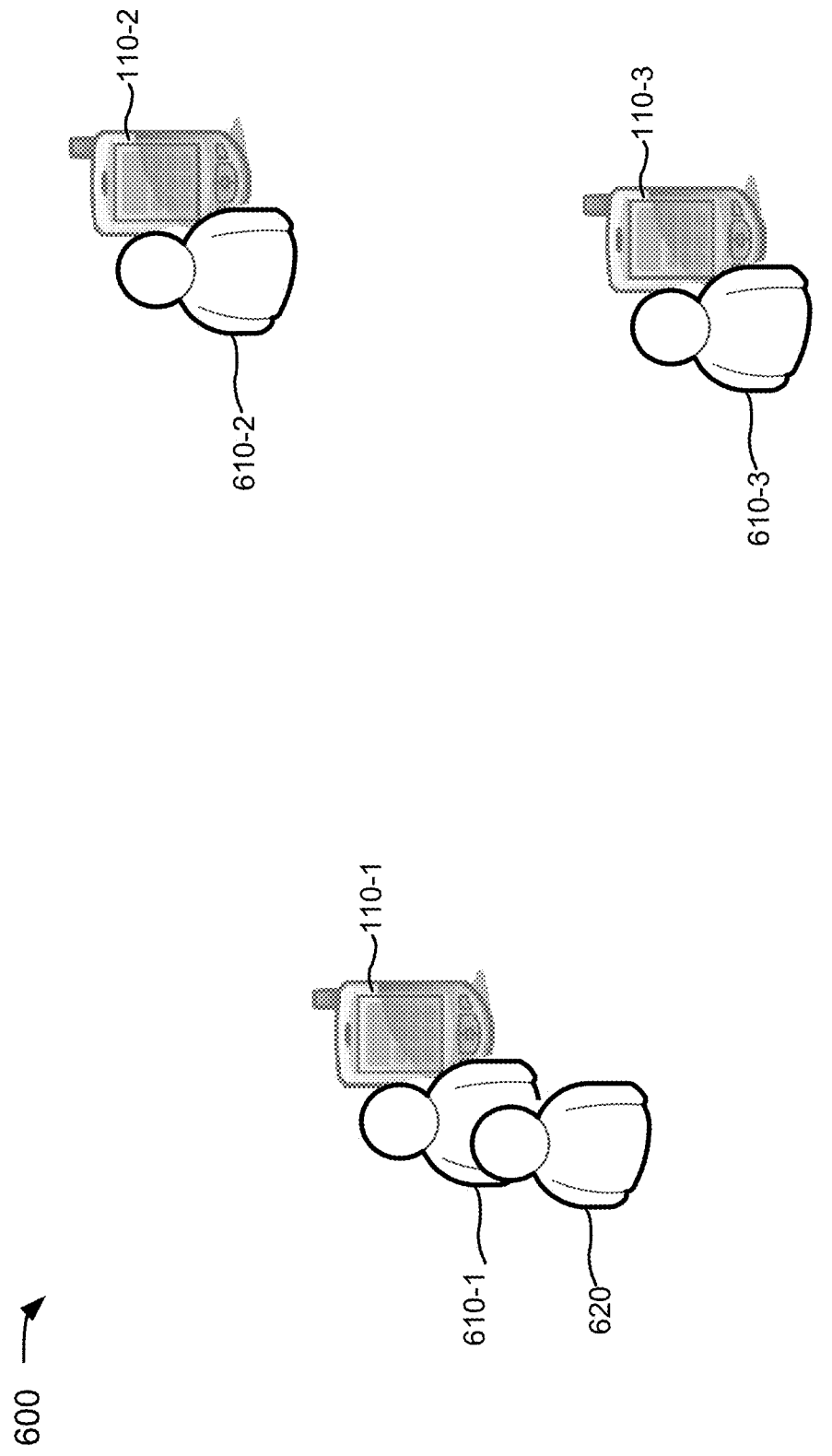
FIG. 6 is a diagram that illustrates an example of muting and un-muting user devices during a conference call.

FIG. 6 is a diagram that illustrates an example of muting and un-muting user devices during a conference call. Assume that a participant 610-1, a participant 610-2, and a participant 610-3 are participating in a conference call by using user device 110-1, user device 110-2, and user device 110-3, respectively. Further assume that user device 110-1 and user device 110-3 are not muted and that user device 110-2 is muted.

Assume that a spouse 620 of participant 610-1 approaches participant 610-1 and starts speaking during the conference call. User device 110-1 may receive a sound of spouse 620 via a microphone of user device 110-1. User device 110-1 may recognize that the sound of spouse 620 matches a background sound that is selected to prompt muting of user device 110-1. In response, user device 110-1 may mute user device 110-1. User device 110-1 may notify participant 610-1 (e.g., display a message, provide an audio notification, provide a visual notification, etc.) that user device 110-1 is now muted.

Participant 610-2 may start speaking while user device 110-2 is muted. User device 110-2 may receive a sound of participant 610-2 speaking via a microphone of user device 110-2. User device 110-2 may recognize that the sound of participant 610-2 speaking matches a vocal pattern associated with user device 110-2 (i.e., the vocal pattern of participant 610-2). In response, user device 110-2 may automatically un-mute user device 110-2. In another implementation, user device 110-2 may provide an indication to inquire whether the user wants to un-mute user device 110-2. In yet another implementation, user device 110-2 may provide the indication when a user profile of participant 610-2 specifies that participant 610-2 registered to disable automatic un-mute for a particular period of time (e.g., several seconds) after a particular sound (e.g., voice of a spouse of participant 610-2) is detected (e.g., because when participant 610-2 speaks afterwards he is usually responding to the spouse). After user device 110-2 detects silence for the particular period of time, user device 110-2 may switch back to automatic un-mute mode. User device 110-2 may notify participant 610-2 that user device 110-2 is now un-muted.

Thereafter, conference management system 120 may recognize that participant 610-2 and participant 610-3 are speaking simultaneously. Conference management system 120 may determine that participant 610-2 is ranked higher than participant 610-3 (e.g., because participant 610-2 is a supervisor of participant 610-3). Conference management system 120 may transmit a mute instruction to user device 110-3 for user device 110-3 to mute user device 110-3. User device 110-3 may mute user device 110-3 in response to the mute instruction. When conference management system 120 determines that participant 610-2 is no longer speaking, conference management system 120 may transmit an un-mute instruction to user device 110-3 for user device 110-3 to un-mute user device 110-3. In response to the un-mute instruction, user device 110-3 may un-mute user device 110-3 and notify participant 610-3 that user device 110-3 is now un-muted.

One implementation, described herein, may prompt muting of user device 110, during a conference call, when a user of user device 110 does not recognize that the device is un-muted and user device 110 is inputting undesired sounds. Accordingly, other participants of the conference call are not distracted by the undesired sounds. Another implementation, described herein, may prompt un-muting of user device 110, during a conference call, when a user of user device 110 does not recognize that the device is muted and needs to be un-muted (e.g., when the user begins speaking). As a result, other participants of the conference call do not have to unnecessarily wait for the user to repeat what was said by that user while on mute and/or miss what the user is saying.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 3-5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a server device, the method comprising:
   determining that a user device is participating in a conference call with a plurality of other user devices;
   providing, by the server device, a plurality of options for muting or un-muting the user device, wherein the plurality of options comprise identifying: a vocal pattern of a user associated with the user device, at least one sound, at least one facial expression associated with the user of the user device, and at least one hand gesture associated with the user of the user device;
   receiving, from the user device, a first option, of the plurality of options, for identifying the at least one sound, wherein the at least one sound is a generic sound that is not a word;
   receiving, from the user device, a second option, of the plurality of options, for identifying the vocal pattern of the user associated with the user device;
   receiving, from the user device, a third option, of the plurality of options, for identifying at least one of the at least one facial expression or the at least one hand gesture associated with the user of the user device;
   receiving, from the user device, a sound during the conference call;
   determining whether the received sound matches the at least one sound;
   determining whether the user device is muted or un-muted;
   muting the user device in response to determining that received sound matches the at least one sound and determining that the user device is un-muted;
   receiving, from the user device, words spoken by the user of the user device during the conference call;
   determining whether the received words match the vocal pattern of the user associated with the user device;
   un-muting the user device in response to determining that the received words match the vocal pattern of the user and determining that the user device is muted;
   receiving, from the user device, image information comprising a facial expression or a hand gesture made by the user during the conference call,
   determining whether the received image information comprising the facial expression or the hand gesture matches the at least one facial expression or the at least one hand gesture associated with the user of the user device; and
   muting the user device in response to determining that the facial expression or the hand gesture matches the at least one facial expression or the at least one hand gesture and determining that the user device is un-muted.

2. The method of claim 1, where un-muting the user device comprises:
   determining whether an automatic un-mute mode is selected for the user or for the user device, and
   un-muting the user device without intervention of the user when the automatic un-mute mode is selected.

3. The method of claim 2, where, when the automatic un-mute mode is not selected, un-muting the user device further comprises:
   indicating to the user that the user device is muted,
   receiving a command from the user to un-mute the user device, and
   un-muting the user device in response to the command.

4. The method of claim 1, where muting the user device comprises one of:
   cancelling the identified sound,
   suppressing the identified sound, or
   eliminating the identified sound.

5. The method of claim 1, further comprising:
   determining whether an automatic mute mode is selected for the user or for the user device, and
   muting the user device without intervention of the user when the automatic mute mode is selected, and
   where, when the automatic mute mode is not selected, muting the user device further comprises:
   indicating to the user that the user device is un-muted,
   receiving a command from the user to mute the user device, and
   muting the user device in response to the command.

6. The method of claim 5, where receiving the command from the user to mute the user device further comprises receiving a response based on one of:
   a voice command,
   a facial expression, wherein the facial expression comprises a particular movement of the lips, tongue or other parts of the face, or
   a hand gesture.

7. The method of claim 1, where receiving the sound from the user device comprises receiving electrical signals associated with the sound.

8. The method of claim 1, where the user device is one of:
   a mobile telephone device,
   a landline telephone device,
   a computer,
   video conferencing equipment, or
   telephone conferencing equipment.

9. The method of claim 1, further comprising:
   identifying a first participant of the conference call, wherein the first participant is associated with the user device;
   identifying a second participant of the conference call;
   determining that a second user device of the plurality of other user devices, associated with the second participant, is not muted;
   receiving, simultaneously, a second sound from the user device and a third sound from the second user device;

determining a first rank associated with the first participant and a second rank associated with the second participant; and muting the second device without muting the first device when a rank associated with the first participant is higher than the second rank associated with the second participant.

10. A device comprising:
a memory to store a vocal pattern of a user associated with the device;
a microphone;
a camera to provide images associated with the user of the device; and
a processor to:
cause the device to participate in a conference call,
provide options for muting or unmuting the device, wherein the options comprise identifying: a vocal pattern of a user associated with the device, at least one sound, at least one facial expression associated with the user of the device, and at least one hand gesture associated with the user of the device,
receive a first option, from the options, for identifying the at least one sound,
receive a second option, from the options, for identifying the vocal pattern of the user associated with the device, and
receive a third option, from the options, for identifying at least one of the at least one facial expression or the at least one hand gesture associated with the user of the device;
receive a sound via the microphone during the conference call,
determine whether the received sound matches the at least one sound to prompt muting, wherein the at least one sound is a generic sound that is not a word,
determine whether the device is muted or un-muted,
mute the device in response to determining that the received sound matches the at least one sound and determining that the device is un-muted,
receive, from the user device, words spoken by the user of the device during the conference call,
determine whether the received words match the vocal pattern of the user associated with the device,
un-mute the device, in response to determining that the received words match the vocal pattern of the user associated with the device and determining that the device is muted,
receive imaging information comprising a facial expression or a hand gesture made by the user during the conference call,
determine whether the facial expression or the hand gesture matches the at least one facial expression or the at least one hand gesture associated with the user of the device, and
muting the device in response to determining that the facial expression or the hand gesture matches the at least one facial expression or the at least one hand gesture and determining that the user device is un-muted.

11. The device of claim 10, where the memory is further to store one or more sounds selected by the user.

12. The device of claim 11, where the one or more selected sounds comprise one or more of:
a sound of a voice different than a voice of the user,
a sound of a dog barking,
a sound of yelling,
a sound of snoring,
a sound of a public announcement, or
a sound of typing.

13. The device of claim 10, wherein the processor is further to:
determine whether an automatic un-mute mode or an indicator un-mute mode is selected by the user,
un-mute the device without intervention of the user when the automatic un-mute mode is selected, and
indicate to the user that the device is muted when the indicator un-mute mode is selected.

14. The device of claim 13, where, when indicating to the user that the device is muted, the processor is further to:
display a message,
provide an audio signal,
a physical signal, or
provide a visual signal.

15. The device of claim 13, where the processor is further to:
receive a command from the user to un-mute the device after indicating to the user that the device is muted, and
un-mute the device in response to the command.

16. One or more non-transitory computer-readable media storing instructions executable by one or more processors of a device to perform a method, the method comprising:
identifying a first participant of a conference call;
determining that a first device of the first participant is not muted;
providing a selection of a plurality of options to prompt muting and unmuting of the first device, wherein the plurality of options comprise identifying: a vocal pattern of the first participant associated with the first device, at least one sound, at least one facial expression associated with the first participant, and at least one hand gesture associated with the first participant;
receiving a first option, of the plurality of options, for identifying the at least one sound, wherein the at least one sound is a generic sound that is not a word;
receiving, a second option, of the plurality of options, for identifying the vocal pattern associated with the first participant;
receiving, a third option, of the plurality of options, for identifying at least one of the at least one facial expression or the at least one hand gesture associated with the first participant;
receiving a first sound from the first device during the conference call;
determining whether the first device is muted or un-muted;
determining whether the first sound matches at least one sound to prompt muting;
automatically muting the first device after determining that the first sound matches at least one sound and the device is un-muted;
receiving image information comprising a facial expression or hand gesture received from the first device;
automatically muting the first device after determining that the received image information comprising the facial expression or the hand gesture matches the at least one facial expression or the at least one hand gesture associated with the first participant, and determining that the first device is unmuted;
receiving, from the first device, words spoken by the first participant during the conference call;
determining that the first participant is speaking in response to identifying that the received words match the vocal pattern of the first participant; and
un-muting the first device in response to determining that the first participant is speaking.

17. The media of claim 16, where the method further comprises:
- identifying a second participant of the conference call;
- determining that a second device, of the second participant, is not muted;
- receiving, simultaneously, a second sound from the first device and a third sound from the second device;
- determining a first rank associated with the first participant and a second rank associated with the second participant; and
- muting the second device without muting the first device in response to determining that the first rank associated with the first participant is higher than the second rank associated with the second participant.

18. The media of claim 16, where the first sound is one of one or more sounds selected by the first participant to prompt muting of the first device.

\* \* \* \* \*